United States Patent [19]

Hayashi et al.

[11] Patent Number: 4,649,857

[45] Date of Patent: Mar. 17, 1987

[54] THIN-FILM FORMING DEVICE

[75] Inventors: Yutaka Hayashi, Ibaraki; Atsuo Itoh; Hideyo Iida, both of Tokyo, all of Japan

[73] Assignees: Itaru Todoriki; Taiyo Yuden Kabushiki Kaisha, both of Tokyo, Japan

[21] Appl. No.: 774,508

[22] Filed: Sep. 10, 1985

[30] Foreign Application Priority Data

Sep. 13, 1984 [JP] Japan .................................. 59-192333

[51] Int. Cl.⁴ .............................................. B05B 15/12
[52] U.S. Cl. ...................................... 118/326; 118/725; 118/728; 118/DIG. 7
[58] Field of Search ................. 118/326, DIG. 7, 725, 118/728; 427/255.3

[56] References Cited

U.S. PATENT DOCUMENTS

| | | | |
|---|---|---|---|
| 2,564,677 | 8/1951 | Davis | 201/73 |
| 3,293,074 | 12/1966 | Nickl | 118/725 X |
| 3,335,697 | 8/1967 | Bischoff | 118/725 X |
| 3,424,628 | 1/1969 | Winings | 118/725 X |
| 3,460,510 | 8/1969 | Currin | 118/725 X |
| 4,371,587 | 2/1983 | Peters | 427/255.3 |

FOREIGN PATENT DOCUMENTS 466321 7/1950 Canada .
613885 1/1986 Japan .

OTHER PUBLICATIONS

Ceramic Association Journal (Japanese) 66 (7) C251, 1958.

Primary Examiner—Shrive P. Beck
Attorney, Agent, or Firm—Flynn, Thiel, Boutell & Tanis

[57] ABSTRACT

A thin-film forming device has a support frame for supporting a substrate to be coated with a thin film, a reaction chamber having a space surrounded by the substrate supported on the support frame, side walls mounted under both sides of the substrate and a bottom wall mounted under the side walls, an atomizer for delivering an atomized solution of a material to be coated on the surface of the substrate, a heater disposed behind the substrate for heating the substrate to a temperature higher than a reaction temperature of the material, and a nozzle connected to the atomizer and disposed in the reaction chamber in facing relation to the substrate for spraying the atomized solution toward the surface of the substrate, and cooling means for cooling at least an inside portion of the bottom wall in facing relation to the substrate to a temperature below the reaction temperature of the material.

10 Claims, 3 Drawing Figures

THIN-FILM FORMING DEVICE

BACKGROUND OF THE INVENTION

The present invention relates to a device for forming a thin film of $SnO_2$, $In_2O_3$, $TiO_2$, $SiO_2$, or the like on a surface of a substrate by spraying an atomized solution of the material over the surface of the substrate which is heated.

One known thin-film forming device of the type described is shown in FIG. 3 of the accompanying drawings. A substrate 2 to be coated with a thin film on a surface thereof is placed in a reaction chamber 1 with the substrate surface directed downwardly. The substrate 2 is heated by a heater 3 located behind the substrate 2. An atomizer 4 and an air blower 5 coupled therewith are disposed below the reaction chamber 1. A nozzle 6 connected to the atomizer 4 is supported in the reaction chamber 1 and opens toward the substrate 2.

An aqueous solution of a chloride such as $SnCl_4$, $InCl_3$, or the like is atomized in the atomizer 4, and the atomized solution is progressively sprayed from the nozzle 6 over the surface of the substrate 2 by the air delivered by a fan 9 in the air blower 5. The surface of the substrate 2 is heated to a temperature higher than the reaction temperature of the material in the solution. For example, the surface of the substrate 2 is heated to a temperature range of from 400° to 500° C. when forming a thin film of $SnO_2$ on the substrate surface.

The atomized solution sprayed toward the surface of the substrate 2 is partially heated in the vicinity of the substrate surface, and dewatered and vaporized. The vaporized material then reacts with oxygen and water vapor in the air to form a thin film of an oxide of Sn, In, or the like on the surface of the substrate 2.

Most of the atomized solution which has been ejected from the nozzle 6 and is not responsible for forming the thin film on the substrate 2 is discharged in the atomized condition from an exhaust outlet 7. When the inner wall surfaces of the reaction chamber 1 are heated by radiation and convection from the heater 3, part of the atomized solution flowing along the inner wall surfaces of the reaction chamber 1 is also dewatered and vaporized. This vaporized material also reacts with oxygen and water vapor and is deposited as a coating on the inner wall surfaces of the reaction chamber 1.

The coating thus deposited on the inner wall surface of the reaction chamber 1 grows as thin films are formed on successive substrates 2. When the deposited coating grows to the thickness of about 4 micrometers, then it is liable to crack due to internal strains, and broken into small fragments which come off the inner wall surfaces and are scattered into the reaction chamber 1. Some of the scattered pieces are applied to the surface of the substrate 2 to develop unwanted defects such as pinholes in the thin film formed on the surface of the substrate 2.

SUMMARY OF THE INVENTION

In view of the difficulty of the conventional thin-film forming device, it is an object of the present invention to provide a thin-film forming device capable of preventing the inner wall surface of a reaction chamber from being coated with a film and also preventing defects such as pinholes from being developed in a thin film formed on the surface of a substrate to be coated.

According to the present invention, there is provided a device for forming a thin film on a surface of a substrate, including a support frame for supporting the substrate, a reaction chamber comprising a space surrounding the substrate supported on the support frame, side walls mounted under both sides of the substrate and a bottom wall mounted under the side walls and extending therebetween, an atomizer for delivering an atomized solution of a material to be coated on the surface of the substrate, a heater disposed behind the substrate for heating the substrate to a temperature higher than the reaction temperature of the material, a nozzle connected to the atomizer and disposed in the reaction chamber in facing relation to the substrate for spraying the atomized solution toward the surface of the substrate, and cooling means for cooling at least an inside portion of the bottom wall in facing relation to the substrate to a temperature below the reaction temperature of the material.

With the arrangement of the present invention, the inner wall surface of the reaction chamber is prevented from being coated with a film, and hence no fragments which would otherwise be produced from the coating on the inner wall surface of the reaction chamber are applied to the surface of the substrate. Therefore, unwanted defects such as pinholes are prevented from being developed in the thin film on the substrate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
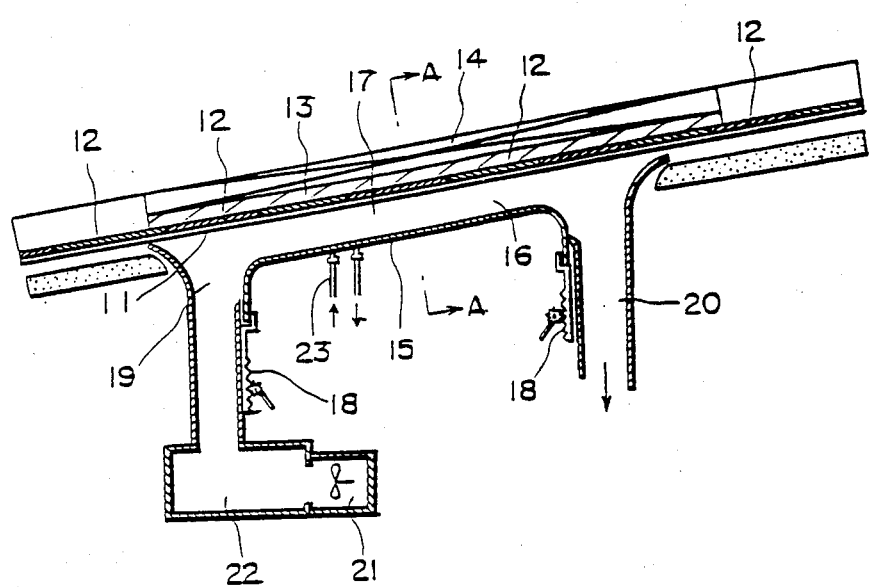
FIG. 1 is a vertical cross-sectional view of a thin-film forming device according to the present invention.
Figure 2:
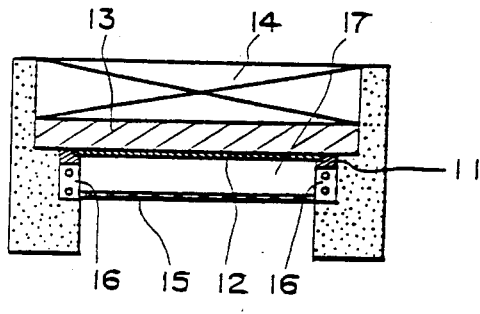
FIG. 2 is an enlarged cross-sectional view taken along line A—A of FIG. 1.
Figure 3:
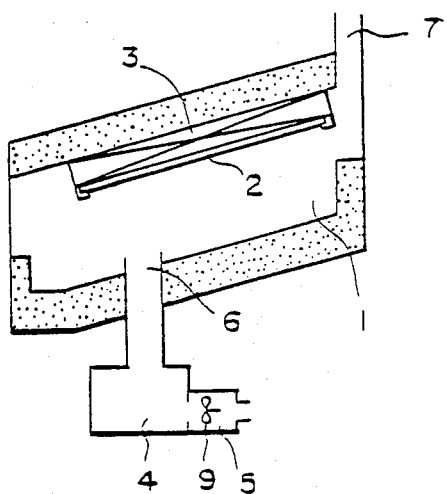
FIG. 3 is a vertical cross-sectional view of a conventional thin-film forming device.

As shown in FIGS. 1 and 2, a plurality of substrates 12 to be coated with thin films are fitted successively in a support frame 11, and are sequentially fed into the device from the right to the left (FIG. 1). A heater 14 is disposed behind the substrates 12 with a heat uniformizing plate 13 of a metal or graphite having good thermal conductivity being interposed between the substrates 12 and the heater 14.

A reaction chamber 17 is bounded by a bottom wall 15 and side walls 16 so as to open toward the surfaces of the substrates 12 which are to be coated. The bottom wall 15 is inclined at an angle of elevation of about 15° and is parallel to the support frame 11. The bottom wall 15 lying in opposed relation to the substrates 12 is provided with a suitable cooling means 23. If necessary, each of the side walls 16 may be provided with a similar cooling means. In the illustrated embodiment, each of the bottom wall 15 and the side walls 16 comprises a cooling panel having a number of passages for a coolant such as water. The cooling means 23 therefore comprises such a cooling panel and a coolant passing therethrough. The bottom wall 15 has a pair of adjusting mechanisms 18 for adjusting the distance of the bottom wall 15 from the substrates 12 and the inclination of the bottom wall 15 with respect to the substrates 12.

A nozzle 19 is provided at the lefthand end (FIG. 1) of the bottom wall 15, the nozzle 19 being connected to an atomizer 22 coupled to an air blower 21. The nozzle 19 opens into the reaction chamber 17 toward the substrates 12. An exhaust outlet 20 is provided at the righthand end of the bottom wall 15.

In operation, the substrates 12 as they face the reaction chamber 17 are heated through the heat uniformizing plate 13 by the heater 14. While at the same time cooling the inner wall surfaces of the reaction chamber 17, i.e., the inner surfaces of the bottom wall 15 and the side walls 16, with the cooling means 23, an atomized aqueous solution of a desired material is supplied from the atomizer 22 by the air blower 21 and gradually sprayed over the surfaces of the substrates 12 by the nozzle 19. At this time, the surfaces of the substrates 12 are kept at a temperature higher than the reaction temperature of the material in the atomized solution sprayed, and the inner surfaces of the bottom wall 15 and the side walls 16 are kept at a temperature lower than the reaction temperature of the material in the atomized solution sprayed.

The atomized solution sprayed on the surfaces of the substrates 12 is dewatered and vaporized by being heated, and the vaporized material reacts with oxygen and water vapor to form a thin film on the surfaces of the substrates 12. The atomized solution having reached the inner wall surfaces of the reaction chamber 17 is however not dewatered and vaporized since the temperature of the inner wall surfaces of the reaction chamber 17 is below the reaction temperature of the material. The atomized solution on the inner wall surfaces of the reaction chamber 17 are not caused to react with oxygen and are discharged under the atomized condition through the exhaust outlet 20 without being deposited as a coating on the inner wall surfaces.

For forming a film of $SnO_2$ with the thin film forming device as illustrated in FIGS. 1 and 2, the surface temperature of the substrates 12 should be kept in the range of from 400° to 500° C., and the surface temperature of the bottom wall 15 should be kept in the range of from 250° to 310° C. for the best results.

Examples of the present invention will be described below.

EXAMPLE 1

An aqueous solution was prepared by dissolving 25 g of tin tetrachloride, 1 g of antimony trichloride, and 4 ml of hydrochloric acid in 150 cc of pure water.

Substrates 12 of glass each having a size of 100 mm × 100 mm and a thickness of 1.0 mm were placed on the support frame 11 inclined at about 15°. The nozzle 19 had an ejection outlet having a width of 90 mm and a length of 20 mm and coated with a layer of porous cordierite porcelain having a thickness of 20 mm and a porosity of 85%. The nozzle 19 was installed so that the center of the ejection outlet thereof was spaced 50 mm from the surface of the substrates 12 disposed directly thereabove.

The surfaces of the substrates 12 are heated to 400° C. while they are moved from the right to the left (FIG. 1) at the speed of 1.5 cm per minute. At the same time, the atomized solution was sprayed from the nozzle 19 at a rate of 1 cc per minute over the surfaces of the substrates 12. The bottom wall 15 was simultaneously water-cooled to keep the surface temperature thereof at 280° C.

As a result, a film of $SnO_2$ having an average thickness of 0.35 micrometer was formed on the surfaces of the substrates 12. No coating was formed on the inner surface of the bottom wall 15.

EXAMPLE 2

The support frame 11 was held horizontally, and the other conditions were the same as those in Example 1. As a consequence, a film of $SnO_2$ having an average thickness of 0.31 micrometer was formed on the surfaces of the substrates 12. No coating was formed on the inner surface of the bottom wall 15.

While in each of Examples 1 and 2 the film of $SnO_2$ was formed, films of other materials such as $In_2O_3$, $TiO_2$, $SiO_2$ and the like may be formed for substantially the same results.

During formation of the thin film on the substrates 12, the substrates 12 may be sequentially fed along as illustrated or may be held at rest.

Although a certain preferred embodiment has been shown and described, it should be understood that many changes and modifications may be made therein without departing from the scope of the appended claims.

What is claimed is:

1. A device for forming a thin-film on a surface of a plurality of substrates while continuously moving said substrates through said device, said device comprising:
   (a) a support frame for supporting said substrates as they travel through said device;
   (b) a heater disposed above said support frame for heating said substrates from the rear to a temperature higher than the reaction temperature of the material for forming said thin film;
   (c) a reaction chamber defined by inner wall surfaces formed on sidewalls disposed to the lateral sides of said support frame and downwardly extending therefrom, and a bottom wall spaced downwardly from the substrates extending between the lower ends of said side walls;
   (d) means for atomizing a thin-film forming solution to be coated on a surface of the substrates;
   (e) means for supplying the atomized solution to said reaction chamber;
   (f) a nozzle defined on the discharge end of said supplying means directed upwardly toward the bottom surface of the substrates to be coated;
   (g) means for cooling at least a portion of said inner surface of said bottom wall of said reaction chamber opposite the substrates to a temperature below the reaction temperature of the material to be coated to prevent the formation of a film thereon; and
   (h) means associated with said reaction chamber providing an outlet for the flow of thin-film forming material from said reaction chamber.

2. A device according to claim 1, wherein said cooling means comprises a cooling panel as said bottom wall, said cooling panel having a number of passages for passage of coolant therethrough.

3. A device according to claim 1, including means for adjusting the distance of said bottom wall from said substrate and the degree of incline of said bottom wall with respect to said substrates.

4. A device according to claim 1, including an air blower connected to said atomizer for forcibly supplying the atomized solution from said atomizer to said nozzle.

5. A device according to claim 1, wherein said substrate is moved linearly on said support frame while the atomized solution is on a surface thereof.

6. A device according to claim 1, including a heat uniformizing plate having good thermal conductivity being interposed between said substrate and said heater.

7. A device for forming a thin-film of material on a surface of a plurality of substrates, comprising:

a longitudinally extending reaction chamber defined on its longitudinally extending sides by opposed lateral side walls; a bottom wall extending therebetween at the lower portions of said side walls;

means for the ingress and egress of thin-film forming material to and from said reaction chamber;

heating means for heating said substrates to a temperature greater than the reaction temperature of the material for forming said thin film;

and a support frame for supporting said substrates and transporting them through said reaction chamber, said support frame being disposed below said heater;

said heating means being disposed between said lateral side walls of said reaction chamber at the upper portion thereof, the longitudinal ends of said reaction chamber being open for passage of substrates therethrough, said bottom wall being adjustably mounted in relation to said heater and support frame for adjustment of the distance maintained between said bottom wall and substrates on said support frame and the angle formed between said bottom wall and the substrates on said support frame longitudinally relative to said reaction chamber;

means for atomizing a solution of thin-film forming material for deposition on the substrates, said atomizing means being connected to said ingress means for supplying the atomized solution to said reaction chamber; a nozzle disposed at the discharge end of said atomizing means upwardly directed for discharge of the thin-film forming material on the lower surface of said substrates to be coated, a discharge port associated with said means of egress for discharge of the atomized spray of thin-film forming material from said reaction chamber, and a means for cooling at least the bottom wall of said reaction chamber opposite said substrates to a temperature below the reaction temperature of the thin-film forming material.

8. A device as claimed in claim 7, wherein a means is disposed between said heater and said carrier for uniformly distributing heat, as generated by said heater, to the substrates.

9. A device as claimed in claim 8, wherein said means for distributing heat is a plate of thermally conductive material.

10. A device as claimed in claim 7, wherein said reaction chamber is upwardly inclined at an angle of about 15° in the direction of movement of the substrates through said device relative to the horizontal.

* * * * *